(12) United States Patent
Theiler et al.

(10) Patent No.: US 11,821,984 B2
(45) Date of Patent: Nov. 21, 2023

(54) PROXIMITY SENSOR BASED ON RATIO CHANGE DETECTION

(71) Applicant: ams International AG, Jona (CH)

(72) Inventors: Helmut Theiler, Eindhoven (NL); Christian Halper, Eindhoven (NL)

(73) Assignee: AMS INTERNATIONAL AG, Rapperswil (CH)

( * ) Notice: Subject to any disclaimer, the term of this patent is extended or adjusted under 35 U.S.C. 154(b) by 193 days.

(21) Appl. No.: 17/428,204

(22) PCT Filed: Feb. 3, 2020

(86) PCT No.: PCT/EP2020/052621
§ 371 (c)(1),
(2) Date: Aug. 3, 2021

(87) PCT Pub. No.: WO2020/161075
PCT Pub. Date: Aug. 13, 2020

(65) Prior Publication Data
US 2022/0120896 A1   Apr. 21, 2022

Related U.S. Application Data

(60) Provisional application No. 62/902,441, filed on Sep. 19, 2019, provisional application No. 62/800,621, filed on Feb. 4, 2019.

(51) Int. Cl.
*G01S 17/04* (2020.01)
*G01J 1/42* (2006.01)
*G06F 3/14* (2006.01)

(52) U.S. Cl.
CPC ............ *G01S 17/04* (2020.01); *G01J 1/4204* (2013.01); *G06F 3/14* (2013.01)

(58) Field of Classification Search
CPC .......... G06F 3/14; G01J 1/4204; G01S 17/04
See application file for complete search history.

(56) References Cited

U.S. PATENT DOCUMENTS

2011/0248151 A1   10/2011   Holcombe et al.

FOREIGN PATENT DOCUMENTS

| CN | 102645654 B | 8/2012 |
| EP | 3352061 A1 | 7/2018 |

*Primary Examiner* — Abbas I Abdulselam
(74) *Attorney, Agent, or Firm* — TAROLLI, SUNDHEIM, COVELL & TUMMINO L.L.P.

(57) ABSTRACT

The present disclosure describes a method and apparatus that can be used to determine whether an object is in proximity of an electronic device. When an object is not in proximity to the electronic device, the arrangement of two sensors at different distances from the optical emitter results in a higher strength of a reflection signal received in the sensor closer to the optical emitter and a lower strength of a reflection signal received in the sensor further from the optical emitter. The system uses this difference in reflection signals to calculate a ratio between the signals that are being reflected to both sensors, and based on the ratio whether an object is in proximity to the electronic device.

20 Claims, 6 Drawing Sheets

PROXIMITY SENSOR BASED ON RATIO CHANGE DETECTION

RELATED APPLICATIONS

The present invention is a U.S. National Stage under 35 USC 371 patent application, claiming priority to Serial No. PCT/EP2020/052621, filed on 3 Feb. 2020; which claims priority from U.S. Provisional Application No. 62/800,621 filed 4 Feb. 2019 and U.S. Provisional Application No. 62/902,441 filed 19 Sep. 2019, the entirety of all of which are incorporated herein by reference.

FIELD OF THE DISCLOSURE

This disclosure relates to proximity sensing.

BACKGROUND

Certain electronic devices are able to detect objects within their proximity and take actions based on the detection. For example, some mobile phones can detect (e.g., during a phone call) a user's ear or face in close proximity and switch off a touch-screen, thus preventing the user from issuing an accidental command to the smartphone. Some electronic devices use an infrared ("IR") emitter and measure return signals when the IR emitter emits a signal.

SUMMARY

Some proximity sensors are placed behind display elements to increase the usable area of a screen. In these situations, the proximity sensors may suffer from very high reflection from components of the display elements (e.g., film layers) interfering with detection of reflections from an object (e.g., a person) at higher distance. Because of the interfering reflections from objects, a determination cannot be made accurately of whether an object is present. The current disclosure addresses this problem by using two sensors (e.g., receiver diodes) placed at different distances from an emitter (e.g., optical emitter).

When an object is not present within a certain distance from the host device (e.g., a smartphone or other portable computing device), the arrangement of the two sensors results in a higher strength of a reflection signal received in the sensor closer to the optical emitter and a lower strength of a reflection signal received in the sensor further from the optical emitter. The system uses this difference in reflection signals to calculate a ratio between the signals that are being reflected to both sensors. When parameters of the system change (e.g., the strength of the emitting signal and/or the reflective materials of the electronic device) the effect is similar with respect to both sensors, and the ratio is unchanged. When an object is present, a reflection from the object in the range of interest results in reflections to both sensors that have similar energy values. This results in a ratio that shifts towards the value of one. The calculated ratio is compared to one or more thresholds to determine whether an object is present and whether an action needs to be taken (e.g., turning off the display screen).

Various actions in this disclosure are described as executed by an electronic control unit ("ECU"). In some implementations, the ECU may be used in combination with software to execute some of the actions described in this disclosure. In these and other implementations, the ECU is coupled to an optical emitter, a first sensor and a second sensor. As discussed above, the first sensor and the second sensor are located at different distances from the optical emitter. The ECU causes an emission of a signal (e.g., instructs the optical emitter to emit an optical pulse) that reflects from the components of the display screen (e.g., film layers) and an object if the object is present within a specific distance. The reflected signals are detected by the first and second sensors, and corresponding energy levels are received by the ECU. The ECU calculates (e.g., using the corresponding energy levels) a ratio between the first signal and the second signal, and compares the ratio with an object presence threshold. In some implementations, the object presence threshold is a ratio (e.g., derived based on testing) that indicates presence of an object. The ECU determines that an object is present if the ratio meets the object presence threshold. For example, if the ratio is approaching a value of one, the ECU determines that an object is present. Thus, the first signal and the second signal are indicative of reflections from the object, if present, in combination with reflections from layers of a display screen.

The ECU is operable to perform an action based on determining the presence of the object (e.g., turn off the display screen and/or touch interface). In some implementations, the ECU, the optical emitter, the first sensor, and the second sensor are mounted on an electronic device that includes a display screen with a touch panel. In these and other implementations, the ECU turns off the display screen and the touch panel, so as to prevent the user from sending an unwanted command through the touch panel.

In some implementations, the presence threshold is determined based on performing ratio calculations with a test object present. Specifically, while the test object is present, the ECU causes an emission using the optical emitter. The ECU receives, as a result of signals reflecting from both the test object and the components of the display screen, detected signals from the first sensor and the second sensor, and calculates a ratio between those signals. Based on the ratio, the ECU determine the object presence threshold. In some implementations the ECU performs these actions multiple times to determine a median, mean, and/or mode values for the presence threshold. Based on these values, the ECU generates the presence threshold. For example, the ECU can generate a presence threshold that is within a specific amount of the calculated ratio (e.g., within ten percent, twenty percent, twenty-five percent, or another suitable amount).

In some implementations, the ECU performs the test without the object being present. That is, the ECU, based on the test, calculate the ratio related to reflections from the just the display components. Based on the calculated ratio, the ECU calculates a threshold for determining that the object is not present, or that the object is no longer present. In some implementations, the presence threshold is a fixed value defined during a pre-series evaluation.

In some implementations, the ECU takes into account an amount of ambient light present. The ECU causes, prior to the first emission, the first sensor and the second sensor to perform an ambient light measurement, and subtracts data representing respective ones of the ambient light measurements from the first signal and from the second signal. Thus, when the ECU receives the signal representing reflections from the display components, the ECU isolates those reflections. In some implementations, the optical emitter is a vertical-cavity surface-emitting laser optical emitter that emits infrared or visible light beam(s) that reflect from the display components and an object in proximity to the device, if present. The reflections are detected by the sensors (e.g., the first sensor and the second sensor) together with ambient light (e.g., that contains the same type of light). Based on the ambient light measurements, the ECU subtracts the ambient light component of the received energy.

In some implementations, the ECU performs ratio calculations to determine when the object is no longer present in proximity to the electronic device. Specifically, the ECU causes, subsequent to the first emission, another emission using the optical emitter, and receives, from the first sensor, another signal corresponding to a reflection of the other emission, and, from the second sensor, yet another signal corresponding to a reflection of the other emission. The ECU calculates a ratio between the two signals received as a result from the other emission, and compares that ratio with an object absence threshold. Based on the comparing, the ECU determines that the object is no longer present, and performs another action based on determining that the object is no longer present. For example, if the user has moved a smartphone away from the user's ear, the ECU detects that the received signals representing reflections from the two optical emitters result in a ratio that favors the closer optical emitter, thereby indicating that the object is no longer present. In this case, the ECU performs can turn the display back on and enable the touch panel. Thus, the fifth signal and the sixth signal are indicative of reflections from reflective layers of the display screen without the object present.

In some implementations, the ECU calculates a ratio based on received energies of the reflected light. Specifically, the ECU calculates, for the first signal, a first amount of light received in the first sensor, and, for the second signal, a second amount of light received in the second sensor. The ECU subtracts a signal indicative of ambient light from the first amount of light and from the second amount of light, and calculates an energy ratio between the first amount of light and the second amount of light.

In some implementations each emission includes multiple optical emitter pulses, and each reflection includes reflections from the multiple optical emitter pulses. In these and other implementations, the ECU subtracts a signal indicative of ambient light energy from energy received as a result of each of the plurality of optical emitter pulses. When that ambient light energy is subtracted the multiple optical emitter pulses are filtered. That is, the ECU filters energy in each of the first reflection and the second reflection received as the result of each of the plurality of optical emitter pulses. In some implementations, the filtering includes averaging the energy of the multiple optical emitter pulses, and in some implementations, filtering includes adding the energy of a defined number of latest results of multiple optical emitter pulses. The ECU calculates a ratio between the filtered energy in each of the first reflection and the second reflection.

The details of one or more implementations are set forth in the accompanying drawings and the description below. Other features and advantages will be apparent from the description and drawings, and from the claims.

DETAILED DESCRIPTION

Figure 1:
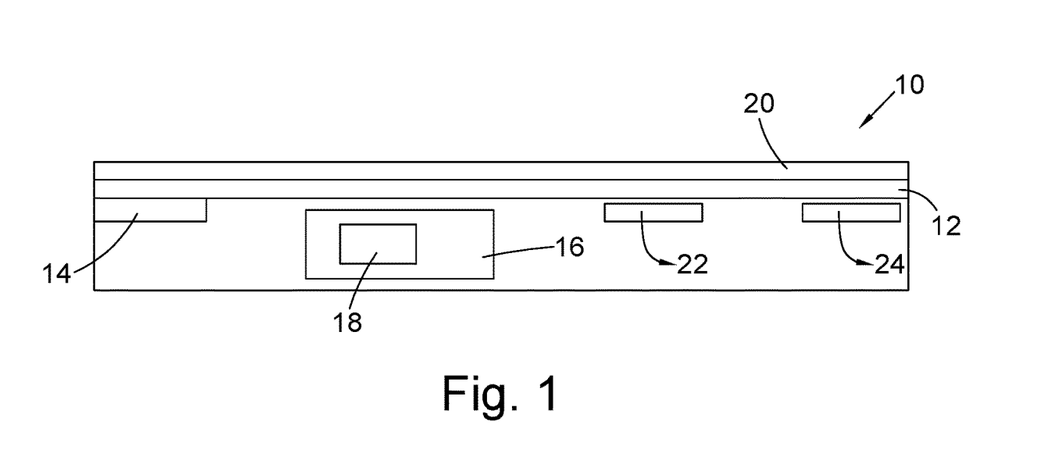
FIG. 1 illustrates an example of an electronic device (e.g., a smartphone).

As shown in FIG. 1, a host device 10 such as a portable computing device (e.g., a smartphone, personal digital assistant (PDA), laptop or wearable) includes an OLED-type or other display screen 12, which can be disposed directly under a front glass 20, which can include multiple reflective layers. Sensors 14 and 22 are disposed directly under a portion of the display screen 12 and are operable to sense ambient light and reflections from the display and objects in the proximity of the host device 10. Sensors 14 and 22 can include one or more photodiodes or other light sensing elements, each of which is sensitive to a respective wavelength, or range of wavelengths that should be as similar to each other as possible.

Optical emitter 24 is also disposed directly under a portion of the display screen 12 and is operable to emit light of wavelength specific wavelength or wavelength range (e.g., visible light, infrared light, or another suitable type of light). Although, this disclosure refers to optical emitters and sensors for receiving optical signals, another type of electromagnetic signal can be used. In some implementations, the emitter can be an acoustic signal emitter (e.g., capable of emitting ultrasonic signals) and the sensors can be designed to detect those signals. In some implementations the optical emitter is a vertical-cavity surface-emitting laser emitter ("VCSEL"). Sensor 22 is located closer to the optical emitter 24 than sensor 14. Thus, when an object is not present in the proximity of device 10, the ratio of signals due to reflections from the display screen 12 favors sensor 22 (the closer sensor to the optical emitter). As referred to in this disclosure, an object being in the proximity of a device, refers to an object being within a path of an emitted optical signal (e.g., from an optical emitter). As referred to in this disclosure, an object not being in proximity to a device, refers to an object not being within a path of an emitted optical signal (e.g., from an optical emitter) such that the object reflects signals from the emitters onto the sensors.

An electronic control unit (ECU) 16 is configured to transmit commands to the optical emitter 24. Commands can include a command to emit one or more pulses or other suitable emissions. The ECU 16 is also configured to receive, process and analyze signals from the sensors 14 and 22. The ECU 16 can be, for example, a processor for the sensor hub or some other processor in the portable computing device 10. The ECU 16 may also be coupled to memory 18. The memory 18 can be any of random access memory, read-only memory, and other suitable memory. In some implementations, ECU 16 can be hard wired logic specifically designed for the actions to be performed in relation to FIG. 2.

Figure 2:
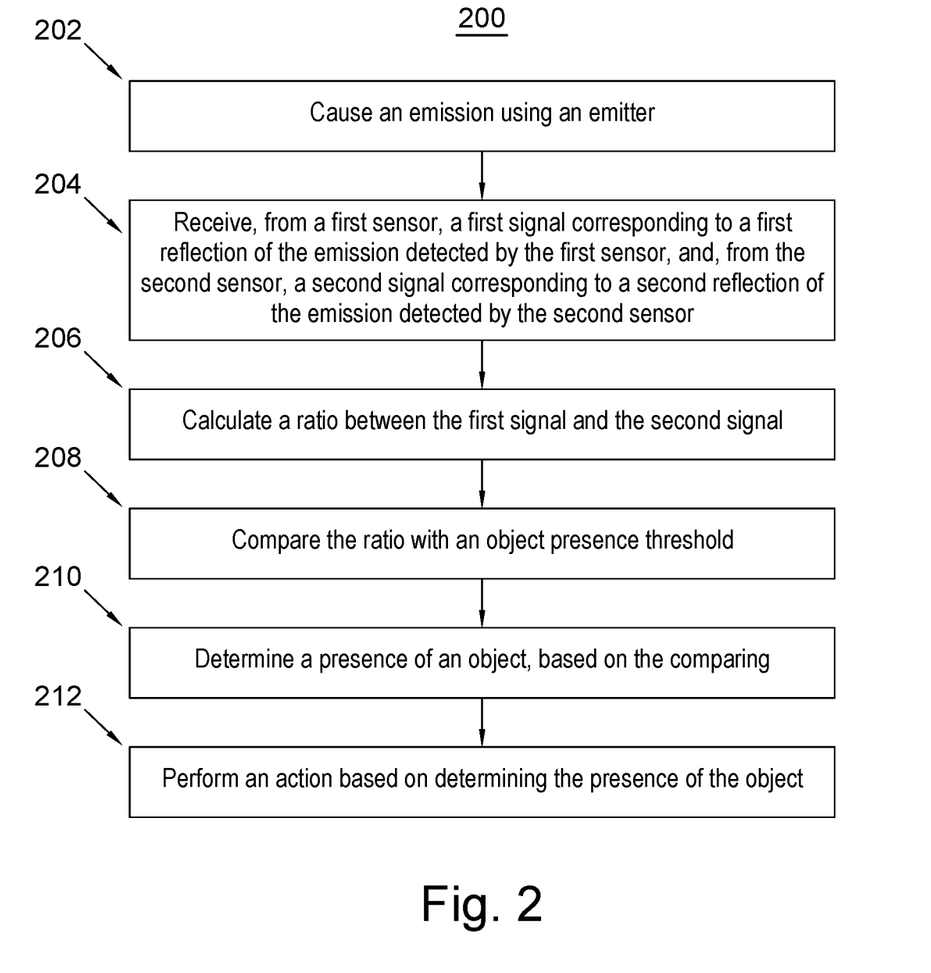
FIG. 2 is a block diagram that illustrates an example of determining that an object is present proximate to an electronic device and taking an action based on the determination.

In some implementations, the components described above are used to determine whether an object is proximate to an electronic device. FIG. 2 is a block diagram that illustrates an example of determining that an object is proximate to an electronic device (e.g., electronic device 10) and taking an action based on the determination. At 202, the ECU causes an emission using an optical emitter (e.g., optical emitter 24). To cause the emission, the ECU can transmit a command to the optical emitter. The optical emitter receives the command and initiates an optical emission.

At 204, the ECU receives, from a first sensor, a first signal corresponding to a first reflection of the emission detected by the first sensor, and, from the second sensor, a second signal corresponding to a second reflection of the emission detected by the second sensor. When the ECU causes the optical emitter to start emitting, the ECU records signals received in both the first and the second sensors. When an object is present in the proximity of the electronic device (e.g., at a distance of 60 millimeters), the sensors (e.g., sensors 14 and 22) detect signals representing reflections from both the display components and the object. The signals are processed in the sensors and processed data is transmitted to the ECU (e.g., ECU 16).

At 206, the ECU calculates a ratio between the first signal and the second signal. If the object is present in proximity to the electronic device (e.g., electronic device 10), because the reflections from the object are stronger than the reflections from the display components, the signals received by each of the two sensors (e.g., sensor 14 and sensor 22) are approximately equal in strength. Thus, in this case, the first signal and the second signal are indicative of reflections from the object in combination with reflections from layers of a display screen.

However, if the object is not present in the proximity of the electronic device, because of the different distance of each sensor from the optical emitter, the sensor closer to the optical emitter (e.g., sensor 22) receives a signal representing reflections from the display components that is stronger than the signal received by the sensor further from the optical emitter (e.g., sensor 14). Thus, the ratio of the signal strength favors the sensor that is closer to the optical emitter. In some implementations, the distance between the furthest sensor and the optical emitter is twice the distance between the closest sensor and the optical emitter. In these and other implementations, the two dimensional dispersion ratio is approximately two, which results in the ratio between the signals being about four.

Figure 3:
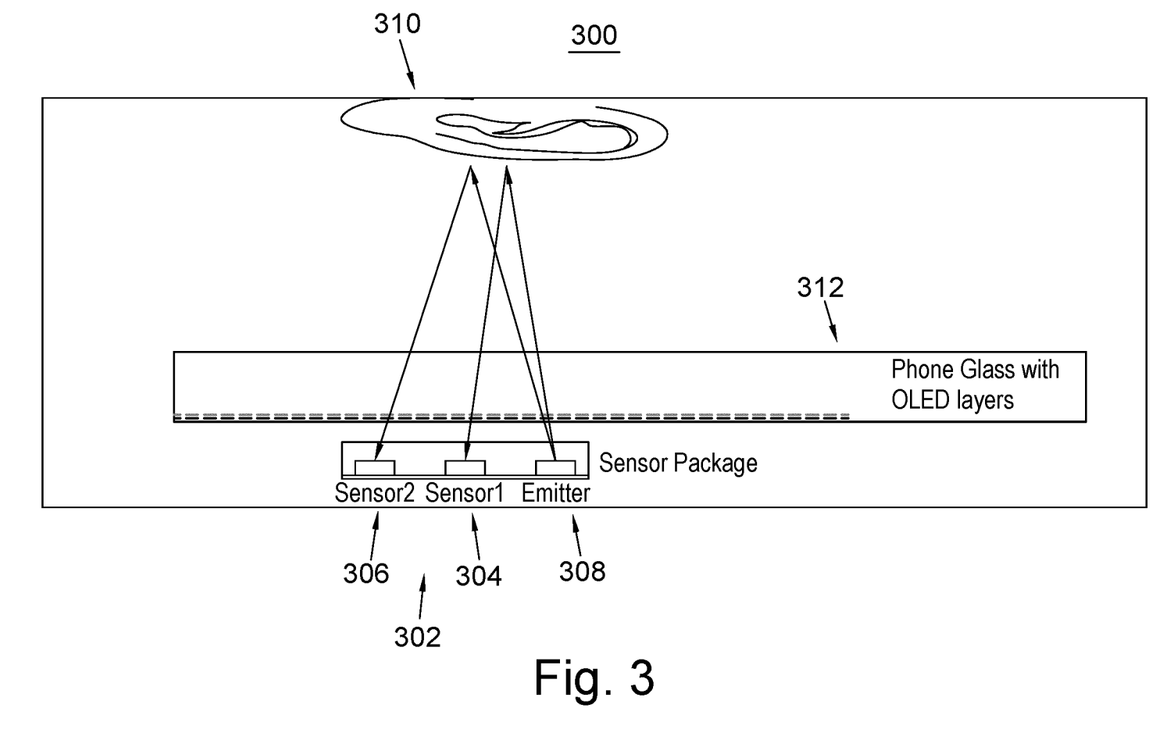
FIG. 3 illustrates an example of signals received by two sensors when an object is present in the proximity of the electronic device.

FIG. 3 illustrates signals detected by two sensors (e.g., sensor1 (304) and sensor2 (306)) when an object is present in proximity to the electronic device. Sensor package 302 includes a first sensor 304 and a second sensor 306. In addition, the sensor package 302 includes an optical emitter 308. The first sensor 304 is located closer to the optical emitter 308 than the second sensor 306. FIG. 3 illustrates object 310 that is in the proximity to a display 312. FIG. 3 illustrates reflections from object 310 into sensor 304 and sensor 306. The reflections from the components of display 312 are not shown in this figure. Those signals are not dominant as compared with the strength of the signal reflected by object 310. Therefore, the ratio moves towards the value of one.

Figure 4:
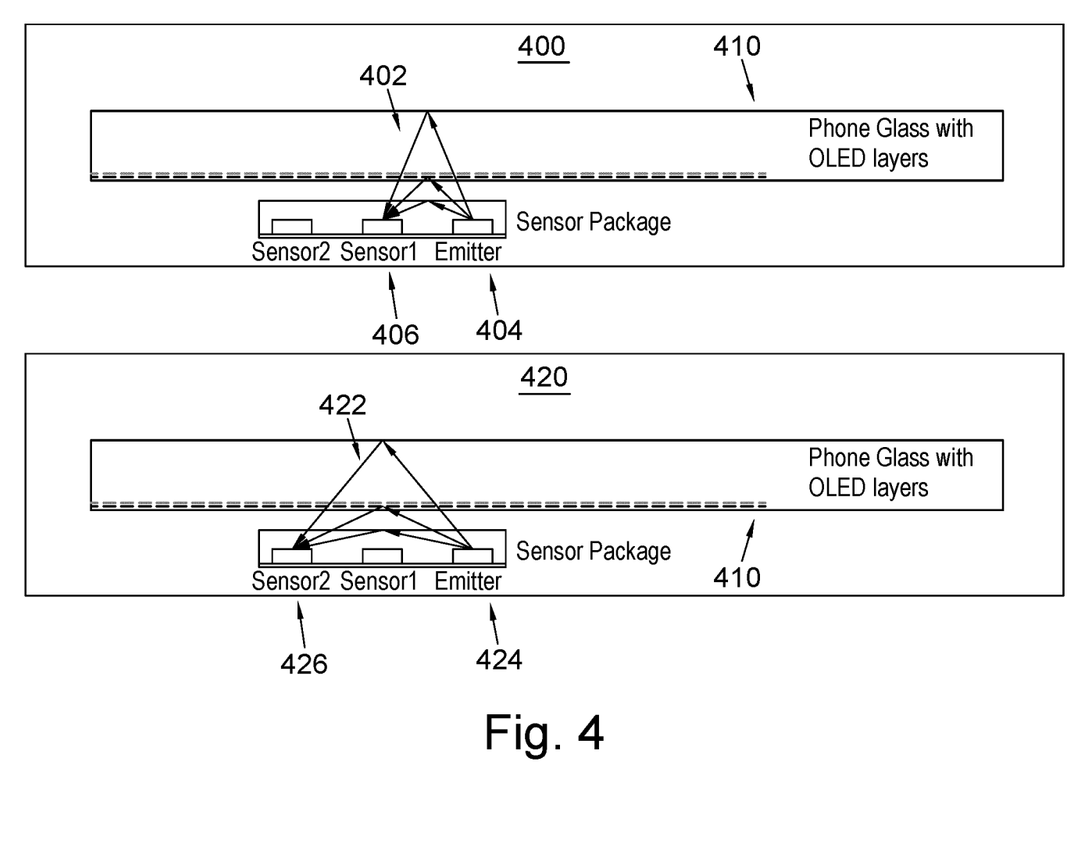
FIG. 4 illustrates an example of signals received by two sensors when an object is not present in the proximity of the electronic device.

FIG. 4 illustrates signals received by two sensors when an object is not present in proximity to the electronic device. Illustration 400 shows components of display 410 reflecting optical emitter signals 402 toward sensor 406. Because there is no object present in proximity to the electronic device, illustration 400 does not show additional signals being received by sensor 406. Illustration 420 shows signal 422 from optical emitter 424 reflected towards sensor 426. As with illustration 400, because there is no object present in the proximity of the electronic device, illustration 420 does not show additional signals being received by sensor 426. The strength of the signal received by sensor 406 is higher than the strength of the signal received by sensor 426, therefore, the ratio of the two signal strengths favors the sensor that is closer to the optical emitter (e.g., sensor 406).

At 208, the ECU compares the ratio with an object presence threshold. In some implementations, the object presence threshold is stored on the electronic device and is retrieved by the ECU for comparison. The threshold can be a number approaching one with a certain variance to account for environmental conditions. In some implementations, the ECU determines the object presence threshold by performing one or more tests. The ECU causes, while the object is present, an emission using the optical emitter. For example, the ECU can receive input from a user indicating that the object is present in the proximity of the electronic device and cause an emission.

The ECU receives, from the first sensor, a signal corresponding to a reflection of the emission detected by the first sensor, and, from the second sensor, a signal corresponding to a reflection of the emission detected by the second sensor. Based on the received signals, the ECU calculates a ratio between the two signals, and determines the object presence threshold based on the second ratio. In some implementations, the ECU stores the ratio as the presence threshold. In some implementations, the ECU sets the threshold lower than the ratio to allow for some variation in the environment. In some implementations, the threshold is a fixed number.

At 210, the ECU determines a presence of an object based on the comparing. If the calculated ratio meets the threshold, the ECU (e.g., ECU 16) determines that the object is present within the vicinity of the electronic device (e.g. electronic device 10). At 212, the ECU performs an action based on determining the presence of the object. If the electronic device is a smartphone, the ECU can turn off the display screen of the device. In some implementations, the ECU disables a touch panel so that a command is not initiated accidently. In some implantations, the ECU upon determining that the object is present, generates a notification on the electronic device to perform an action. Based on the notification, the electronic device can perform an action (e.g., turning off a display screen and/or disabling touch input on the display screen).

In some implementations, the ECU takes into account ambient light when determining whether an object is present in a proximity of the electronic device. For example, if the optical emitter uses a certain frequency or range of frequencies (e.g., in the infrared spectrum, visible spectrum, or another suitable frequency), ambient light, of the same frequency and/or frequency range can be detected by the sensors and be mistaken for signals representing reflections from an object in the proximity of the device. In some implementations, the ECU determines an amount of ambient light that can affect the sensors. For example, the ECU can cause, prior to calculating the ratio, the first sensor and the second sensor to perform an ambient light measurement. To perform the ambient light measurement (e.g., for the proper frequency), the ECU measures the amount of light that is detected by the sensors without an emission. The measurements can be taken over a period of time and adjusted for the timing of the emission. For example, if the emission is a VCSEL pulse of a certain duration, the ECU measures sensor detection of ambient light for that duration. In some implementations, the ECU performs multiple measurements to determine the amount of ambient light that is detected by the sensors and averages the determined amount for the appropriate duration.

The ECU subtracts data representing respective ones of the ambient light measurements from the first signal and from the second signal. For example, when the sensors detect signals generated as a result of reflections from an optical emitter signal, in some cases, in combination with reflections from an object in the proximity of the host device, those signals can be in the form of energy levels. The ECU subtracts, from the detected energy levels, energy contributed by ambient light, as measured by the ECU prior to the emission.

In some implementations, the ECU performs the following actions in ratio calculations. The ECU calculates, for the first signal, a first amount of light received in the first sensor, and, for the second signal, a second amount of light received in the second sensor. For example, both sensors can be configured (e.g., by using filters) to sense light in a specific frequency range. The optical emitter can also be configured to emit light in the same frequency range. It is beneficial that sensors have optical filters which provide highest sensitivity at the wavelength sent out from the emitter. Various frequency range can be used including in the visible light spectrum, infrared light spectrum, or another suitable frequency range.

Because ambient light will interfere with the operation of the system, the ECU subtracts a signal indicative of ambient light from the first amount of light and from the second amount of light. Ambient light generally includes light in various frequency ranges depending on the environment. For example, if the electronic device is outside (e.g. in sunlight), the light energy from the sun can contribute to the detected amounts. In another example, if the electronic device is inside where various artificial light sources are present, the light energy from those sources can contribute to the detected amounts of light. The ECU then calculates an energy ratio between the first amount of light and the second amount of light with subtracted ambient light components.

In some implementations, the ECU determines when the object is no longer in the proximity of the electronic device. To accomplish that, the ECU causes, subsequent to the original emission, another emission using the optical emitter. The ECU receives, from the first sensor and the second sensor, signals corresponding to a reflection of the particular emission, and calculates a ratio between these received signals. If the object is no longer present in the proximity of the electronic device, the received signals will have a ratio that is skewed toward the sensor that is closed to the optical emitter. Thus, the ratio will not be close to one, as in the case when the object is present in proximity to the electronic device. The ECU compares this ratio with an object absence threshold (e.g., a ratio indicating that no object is present), and determines, based on the comparing, that the object is no longer present.

The ratio can be stored on the electronic device and retrieved for comparison. To derive the ratio, the ECU can again perform one or more tests when there is no object in the proximity of the electronic device. In some implementations, the ECU presents a prompt to the user to execute the test when no object is present in the proximity to the host device. The ECU can perform the test multiple times to determine the absence threshold. Based on determining that the object is no longer present, the ECU performs another action. For example, when the ECU determines that the object is no longer present, the ECU can turn on the display screen and/or enable a touch panel on the electronic device. The ECU upon determining that the object is no longer present, can generate a notification to the electronic device to perform an action. Thus, these two signals are indicative of reflections from reflective layers of the display screen without the object present. In some implementations, the absence threshold is a fixed number.

In some implementations, the ECU causes the optical emitter to generate an emission periodically, for example, every one hundred milliseconds while an object is not detected, and every fifty milliseconds when the object has been detected. In this instance, the ratio calculation and threshold comparison occurs after every emission. When the ECU determines that the object is now within the proximity of the electronic device, the ECU can change the emission rate to a smaller period (e.g., from one hundred milliseconds to fifty milliseconds). The ECU keeps calculating the ratio and comparing this ratio to the object absence threshold after each emission. If the ECU determines that the object absence threshold has been met, the ECU performs another action (e.g., turning on the display screen and/or enabling a touch panel of the electronic device). In some implementations, the ECU can change the emission rate to be less frequent (e.g., from fifty milliseconds to one hundred milliseconds). Thus, in these instances the emission can include multiple optical emitter pulses, and the reflections from the plurality of the optical emitter pulses can be aggregated.

Figure 5:
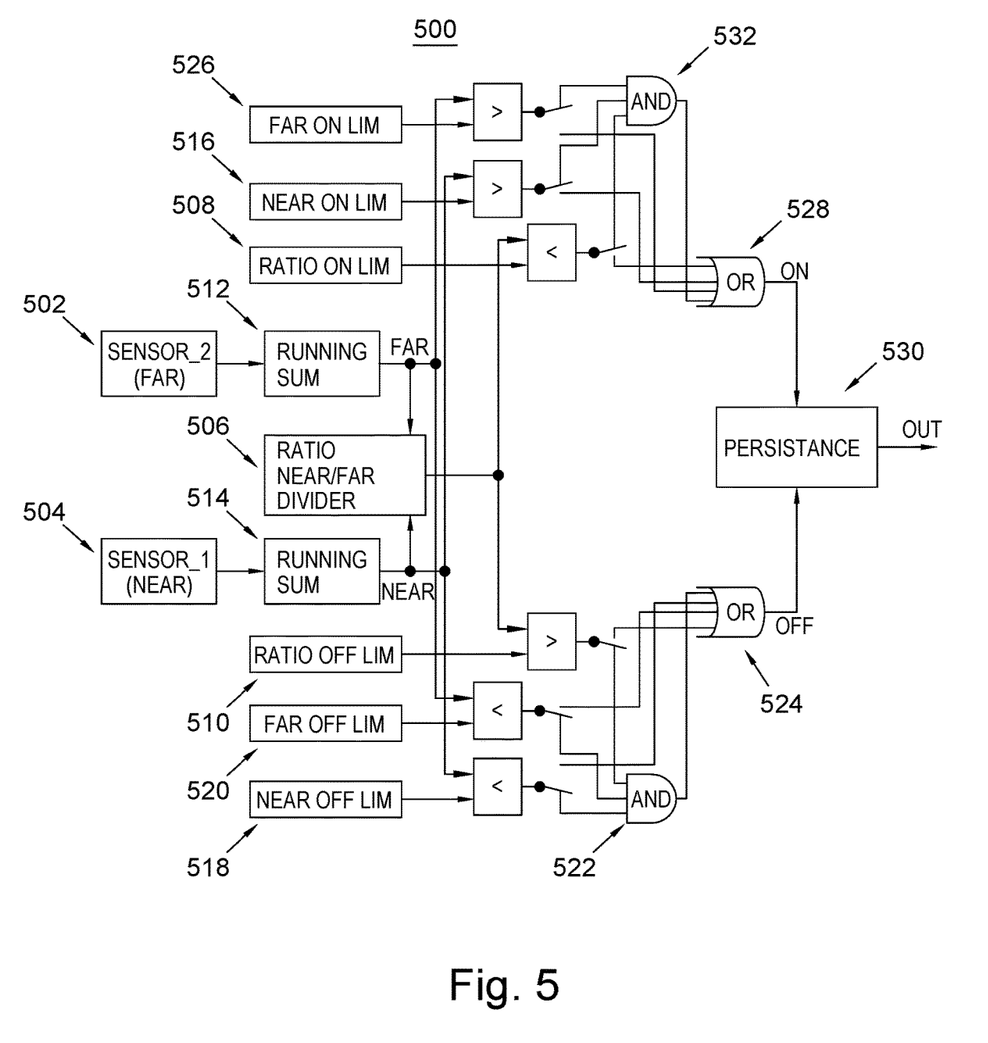
FIG. 5 illustrates an example of a comparator module.

In some implementations, the ratio calculation and the action determinations are performed by a comparator module. The comparator module can include one or more circuits (e.g., including various gates). In some implementations, the comparator module includes software components and hardware components (e.g., control circuitry) and can be included in the ECU (e.g., ECU 16). FIG. 5 illustrates an example of the comparator module 500. The comparator module 500 receives signal data 504 from the sensor closer to the optical emitter and signal data 502 from the sensor further from the optical emitter. In some implementations, the received data 502 and 504 has been adjusted to remove detected ambient light. Data 502 and 504 is received in the ratio divider 506, where a ratio is computed between data 504 and data 502. The computed ratio is compared with ratio on limit 508 to determine whether an object has been detected in the proximity of the electronic device. The comparator module compares the ratio with the ratio off limit 510 to determine whether an object is no longer being detected in the proximity of the electronic device.

Figure 6:
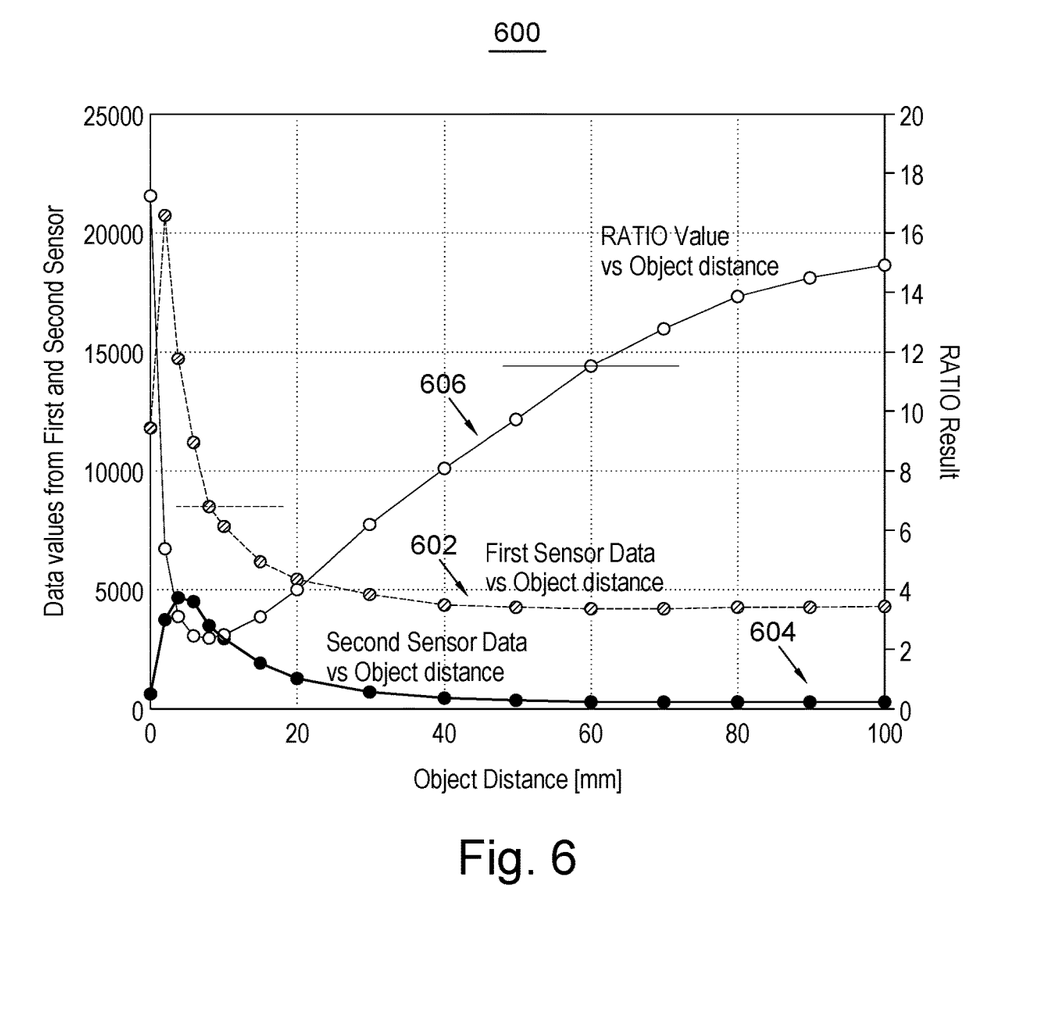
FIG. 6 illustrates a graph of a change in ratio versus object distance.

In some implementations, when the object is very close to the electronic device (e.g., around 5 millimeters), the ratio calculation is supplemented by a comparison of energy detection from the sensors. FIG. 6 includes a graph 600 that illustrates how a ratio of data values from the first sensor and the second sensor changes as distance between the electronic device and the object changes. Curve 602 represents data representing detected energy by the sensor closer to the optical emitter while curve 604 represents data representing detected energy by the sensor further from the optical emitter. After around the seven millimeter distance the curves show a constantly rising ratio between the near and far sensor data, which can just hardly be seen on the curves 602 and 604. As a result, curve 606 show a constant increase in the ratio value versus object distance. However, when the object is very close to the electronic device (e.g., less than five millimeters), the curves show that the ratio may not be a reliable indicator of the object being in the proximity of the electronic device. In that case, the ECU can use a straight reflection reading to determine whether there is an object in the proximity of the electronic device. One scenario where this can be useful is when the user bring the electronic device up to the user's ear from the side instead of from some distance away. Thus, as soon as the object is detected, it is at a very small distance from the electronic device.

The comparator of FIG. 5 also can be used in this scenario. Thus, in some implementations, Sensor2 data 502 is sent to a running sum module 512 that sums up continuously a defined number of latest samples of the received data. Sensor1 data 504 is sent to a running sum module 514 that sums up continuously a defined number of latest samples of the received data. In some implementations, the running sum modules 512 and 514 can use filters (e.g., an addition filter, an average filter, or another suitable filter) to modify the data to get ready for threshold comparison.

The running sum data from the running sum module 514 that includes data from the sensor closer to the optical emitter is compared with a near on limit 516 (e.g., object presence threshold) to determine whether the signal representing reflections from the object detected by the closer sensor are so strong that the object is within a very close proximity (e.g., with five millimeters) of the electronic device. If the near on limit 516 meets the running sum 514, the running sum data from the running sum module 512 is compared with a far on limit 526 to determine whether the signals representing reflections from the object detected by the sensor further from the optical emitter are so strong that the object is in a very close proximity (e.g., with five millimeters) of the electronic device. In some implementations, the decisions of whether both thresholds are met are provided to an "AND" gate 532 to determine whether the object is within the proximity of the electronic device. If both sensors, based on the sensor data, indicate that the object is in the close proximity of the electronic device, "AND" gate 532 returns a true result. In some implementations, instead of the "AND" gate 532 an "OR" gate can be added to the comparator module. In this case, if one or both sensors indicate that the object is in the proximity of the electronic device, the gate returns a true result. The result of the "AND" gate 532, or in some implementations of the "OR" gate, along with the result of the ratio threshold comparison gate are provided to the "OR" gate 528 to make a final determination of whether there is an object in the proximity of the electronic device.

The comparator module uses a similar method to determine whether the object is no longer in proximity of the electronic device. The running sum data from running sum module 514 is compared with near off limit 518 to determine whether the object is no longer in the very close proximity of the electronic device based on signals detected by the sensor located closer to the optical emitter. The running sum data from the running sum module 512 is compared with the far off limit 520 to determine whether the object is no longer in the very close proximity of the electronic device based on signals detected by the sensor located further away from the optical emitter. The results of both comparisons are provided to "AND" gate 522. If data from both sensors indicates that the object is no longer in the close proximity to of the electronic device the "AND" gate 522 provides a true result. Otherwise, the "AND" gate 522 provides a false result. In some implementations, the "AND" gate 522 is replaced by an "OR" gate. The "OR" gate provides a true result if one or both sensors (based on the sensor data) indicate that the object is no longer in the proximity of the electronic device. The result of this gate is provided to gate 524 where a final determination is made on whether the object is no longer in the proximity of the electronic device. That is, if the ratio determination or the result of gate 524 is true, the comparator module determines that the object is no longer in the proximity of the electronic device.

In some implementations, the comparator module includes a persistence module 530. The persistence module 530 determines whether the result of the calculations from gate 528 and/or gate 530 indicates a change in status. For example, whether an indication that the object is in the proximity of the device is a different indication from the last indication. If the indication is not different the persistence module 530 does not initiate output. However, if the indication is different for a defined number of consecutive samples, the persistence module 530 initiates output.

The design of smartphones and other host computing devices referenced in this disclosure can include one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

Various aspects of the subject matter and the functional operations described in this disclosure can be implemented in digital electronic circuitry, or in software, firmware, or hardware, including the structures disclosed in this specification and their structural equivalents, or in combinations of one or more of them. The electronic control unit incorporates digital control circuitry that is configured to perform the actions required to detect an object in the proximity of the device and perform an action based on that detection. In some implementations, the ECU incorporates one or more of software, firmware, or other hardware to facilitate the actions of this disclosure. In addition, aspects of the subject matter described in this disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous.

A number of embodiments have been described. Nevertheless, it will be understood that various modifications may be made without departing from the spirit and scope of the invention. For example, some of the steps described above may be order independent, and thus can be performed in an order different from that described.

Other implementations are within the scope of the following claims.

The invention claimed is:

1. An apparatus comprising:
an optical emitter;
a first sensor located at a first distance from the optical emitter;
a second sensor located at a second distance from the optical emitter, wherein the second distance is different from the first distance, and wherein each of the first sensor and the second sensor is operable to detect a signal emitted by the optical emitter; and
an electronic control unit operable to:
cause a first optical emission using the optical emitter;
receive, from the first sensor, a first signal corresponding to a first reflection of the first optical emission detected by the first sensor, and to receive, from the second sensor, a second signal corresponding to a second reflection of the first optical emission detected by the second sensor;
calculate a first ratio between the first signal and the second signal;
compare the first ratio to an object presence threshold;
determine a presence of an object, based on the comparing; and
perform an action based on determining the presence of the object.

2. The apparatus of claim 1 further including a display screen, wherein the first signal and the second signal are indicative of reflections from the object in combination with reflections from layers of the display screen.

3. The apparatus of claim 1, further comprising a display screen including a touch panel, wherein the action comprises turning off the display screen and the touch panel.

4. The apparatus of, wherein the electronic control unit is further operable to:
cause, while the object is in proximity to the apparatus, a second optical emission using the optical emitter;
receive, from the first sensor, a third signal corresponding to a third reflection of the second optical emission detected by the first sensor, and receive from the second sensor, a fourth signal corresponding to a fourth reflection of the second optical emission detected by the second sensor;
calculate a second ratio between the third signal and the fourth signal; and
determine the object presence threshold based on the second ratio.

5. The apparatus of claim 1, wherein the electronic control unit is further configured to:
cause, prior to the first optical emission, the first sensor and the second sensor to perform an ambient light measurement; and
subtract data representing respective ones of the ambient light measurements from the first signal and from the second signal.

6. The apparatus of claim 1, wherein the electronic control unit is further configured to:

cause, subsequent to the first optical emission, a third optical emission using the optical emitter;
receive, from the first sensor, a fifth signal corresponding to a fifth reflection of the third optical emission, and receive from the second sensor, a sixth signal corresponding to a sixth reflection of the third optical emission;
calculate a third ratio between the fifth signal and the sixth signal;
compare the third ratio to an object absence threshold; and
determine, based on the comparing, that the object is no longer present; and
perform another action based on determining that the object is no longer present.

7. The apparatus of claim 6, wherein the fifth signal and the sixth signal are indicative of reflections from reflective layers of the display screen without the object in proximity to the apparatus.

8. The apparatus of claim 1, wherein the electronic control unit is operable to calculate the first ratio between the first signal and the second signal by:
calculating, for the first signal, a first amount of light received in the first sensor;
calculating, for the second signal, a second amount of light received in the second sensor; subtracting a signal indicative of ambient light from the first amount of light and from the second amount of light; and
calculating an energy ratio between the first amount of light and the second amount of light.

9. The apparatus of claim 1, wherein the first optical emission comprises a plurality of optical emitter pulses, and each of the first reflection and the second reflection comprises reflections from the plurality of the optical emitter pulses.

10. The apparatus of claim 9, wherein the electronic control unit is operable to calculate the first ratio between the first reflection and the second reflection by:
subtracting a signal indicative of ambient light energy from energy received as a result of each of the plurality of optical emitter pulses;
filtering energy in each of the first reflection and the second reflection received as the result of each of the plurality of optical emitter pulses; and
calculating a ratio between the filtered energy in each of the first reflection and the second reflection.

11. A method comprising:
causing a first optical emission from an optical emitter;
receiving, from a first sensor located closer to the optical emitter than the second sensor, a first signal corresponding to a first reflection of the first optical emission detected by the first sensor, and receiving from the second sensor, a second signal corresponding to a second reflection of the first optical emission detected by the second sensor;
calculating, using an electronic control unit, a first ratio between the first signal and the second signal;
comparing the first ratio with an object presence threshold;
determining an object in proximity to a host device, based on the comparing; and
performing an action based on determining the presence of the object.

12. The method of claim 11, wherein the first signal and the second signal are indicative of reflections from the object in combination with reflections from layers of a display screen.

13. The method of claim 11, wherein the action comprises turning off a display screen and a touch panel of the host device.

14. The method of claim 11, further comprising:
   causing, while the object is in proximity to the host device, a second optical emission using the optical emitter;
   receiving, from the first sensor, a third signal corresponding to a third reflection of the second optical emission detected by the first sensor, and receiving, from the second sensor, a fourth signal corresponding to a fourth reflection of the second optical emission detected by the second sensor;
   calculating a second ratio between the third signal and the fourth signal; and
   determining the object presence threshold based on the second ratio.

15. The method of claim 11, further comprising:
   causing, prior to the first optical emission, the first sensor and the second sensor to perform an ambient light measurement; and
   subtracting data representing respective ones of the ambient light measurements from the first signal and from the second signal.

16. The method of claim 11, further comprising:
   causing, subsequent to the first optical emission, a third optical emission using the optical emitter;
   receiving, from the first sensor, a fifth signal corresponding to a fifth reflection of the third optical emission, and, from the second sensor, a sixth signal corresponding to a sixth reflection of the third optical emission;
   calculating a third ratio between the fifth signal and the sixth signal;
   comparing the third ratio with an object absence threshold; and
   determining, based on the comparing, that the object is no longer present; and
   performing another action based on determining that the object is no longer present.

17. The method of claim 16, wherein the fifth signal and the sixth signal are indicative of reflections from reflective layers of the display screen without the object present.

18. The method of claim 11, wherein calculating the first ratio between the first signal and the second signal comprises:
   calculating, for the first signal, a first amount of light received in the first sensor;
   calculating, for the second signal, a second amount of light received in the second sensor;
   subtracting a signal indicative of ambient light from the first amount of light and from the second amount of light; and
   calculating an energy ratio between the first amount of light and the second amount of light.

19. The method of claim 11, wherein the first optical emission comprises a plurality of optical emitter pulses, and each of the first reflection and the second reflection comprises reflections from the plurality of the optical emitter pulses.

20. The method of claim 19, wherein calculating the first ratio between the first reflection and the second reflection comprises:
   subtracting a signal indicative of ambient light energy from energy received as a result of each of the plurality of optical emitter pulses;
   filtering energy in each of the first reflection and the second reflection received as the result of each of the plurality of optical emitter pulses; and
   calculating a ratio between the filtered energy in each of the first reflection and the second reflection.

* * * * *